United States Patent
Cote et al.

[11] 3,733,107
[45] May 15, 1973

[54] ENDLESS TRACK TENSION RELEASE MECHANISM

[75] Inventors: Gilles Yvon Cote; Jacques Bombardier, both of Valcourt, Quebec, Canada

[73] Assignee: Bombardier Limited, Valcourt, Quebec, Canada

[22] Filed: July 19, 1971

[21] Appl. No.: 163,823

[52] U.S. Cl. ............................................ 305/10
[51] Int. Cl. ........................................ B62d 55/30
[58] Field of Search ................ 305/10; 91/390; 60/51

[56] References Cited

UNITED STATES PATENTS

| | | | |
|---|---|---|---|
| 3,539,229 | 11/1970 | Scully | 305/10 |
| 3,574,418 | 4/1971 | Okabe | 305/10 |
| 2,818,311 | 12/1957 | Ashley | 305/10 |

FOREIGN PATENTS OR APPLICATIONS

| | | | |
|---|---|---|---|
| 1,095,681 | 12/1960 | Germany | 305/10 |

Primary Examiner—Richard J. Johnson
Assistant Examiner—Reinhard Eisenzopf
Attorney—Larson, Taylor and Hinds

[57] ABSTRACT

The disclosure herein describes a mechanism adapted to take up the overload exerted on the track of a crawler-type vehicle when an obstruction is lodged between the track and the wheel. The mechanism consists of a first cylinder filled with a fluid, such as oil or grease, and which receives a piston with one end connected to a wheel axle of the vehicle; the cylinder is hydraulically connected to a second fluid-filled cylinder by means of hydraulic conduits and valves. When the inward force on the wheel axle exceeds a predetermined value, the grease or oil in the first cylinder is transferred to the second cylinder; when the obstruction is removed, a prestressed spring in the second cylinder causes the return of the grease or oil into the first cylinder which, in turn, actuates its piston to return the wheel to its original position. A safety check valve is provided to allow the grease to be discharged outside the mechanism if the inward force on the wheel axle exceeds a second predetermined value greater than the first predetermined value.

4 Claims, 4 Drawing Figures

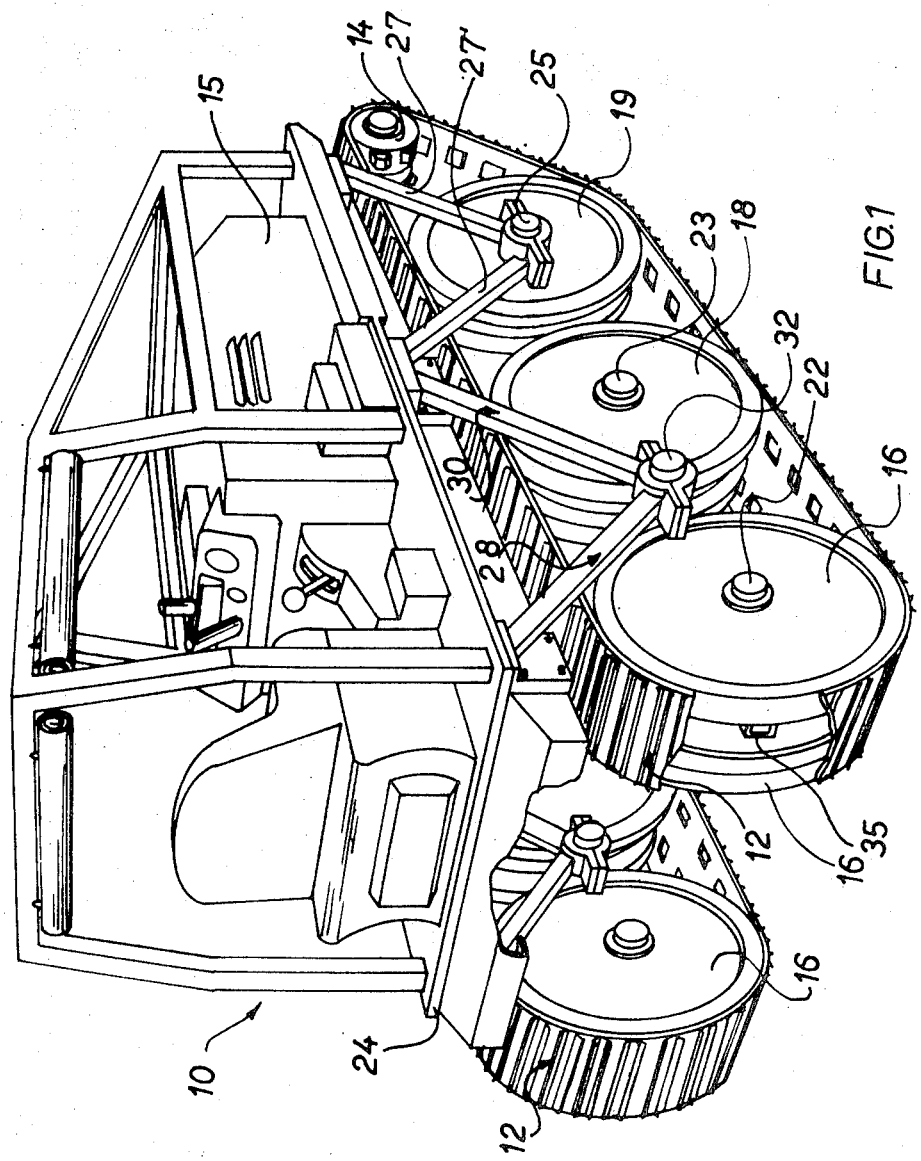

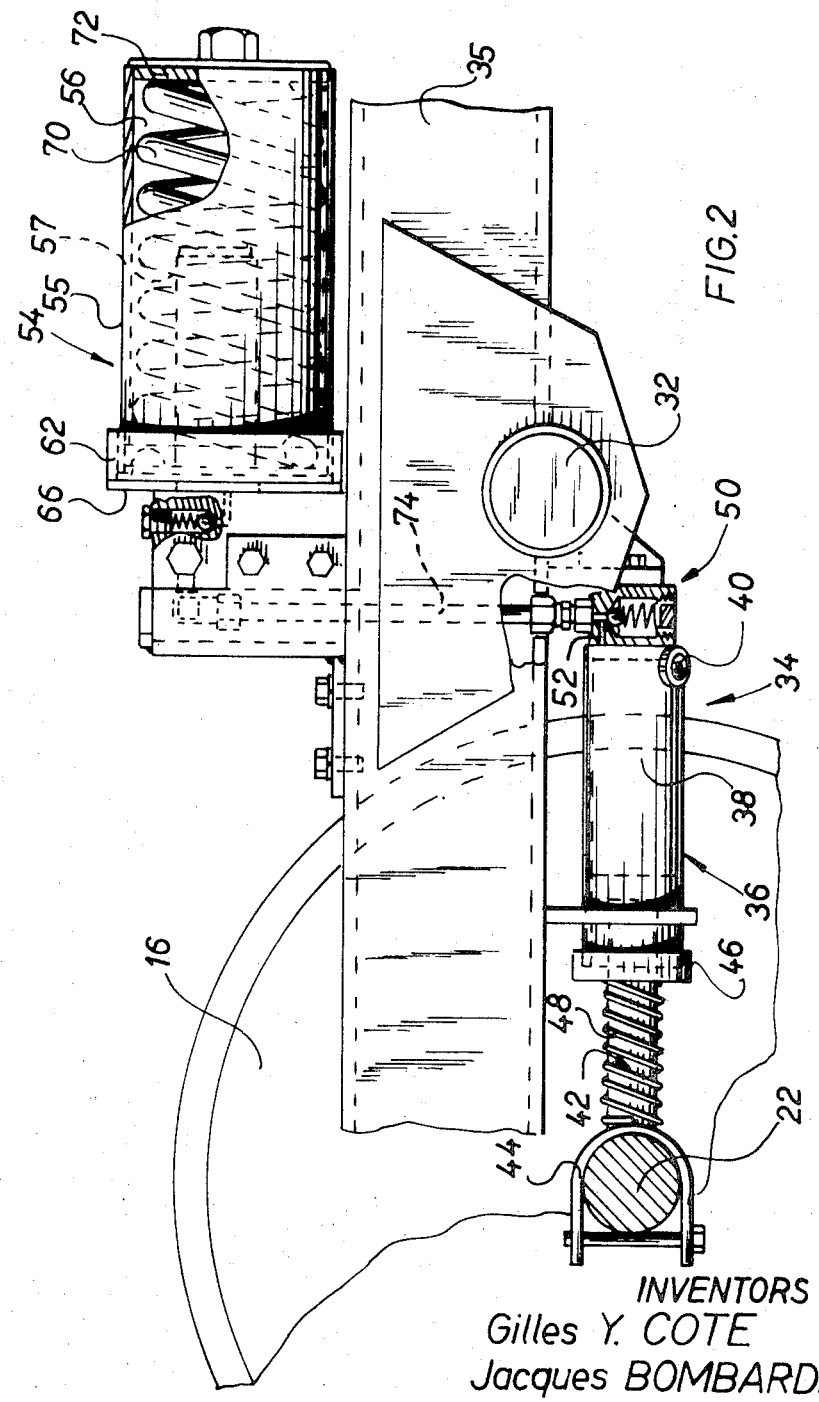
INVENTORS
Gilles Y. COTE
Jacques BOMBARDIER

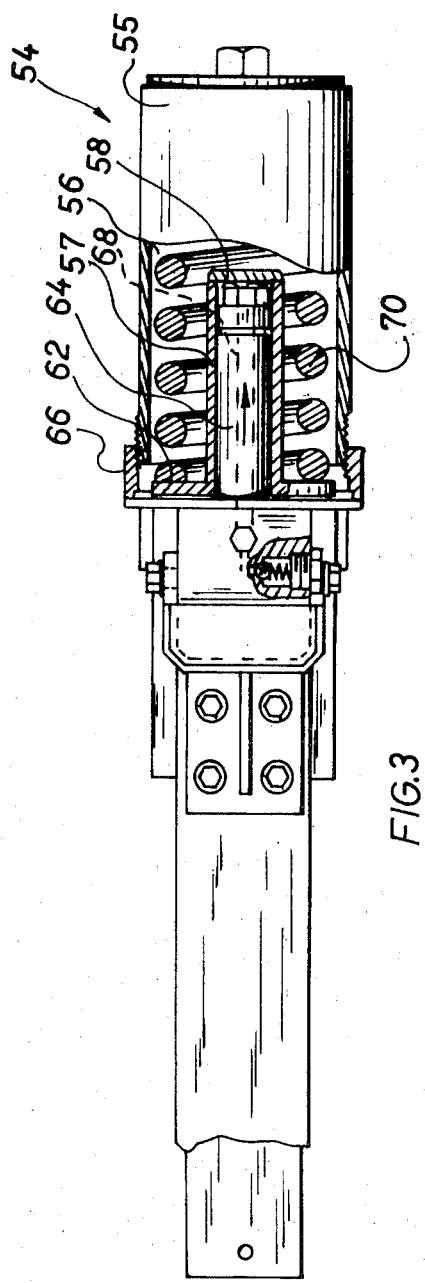
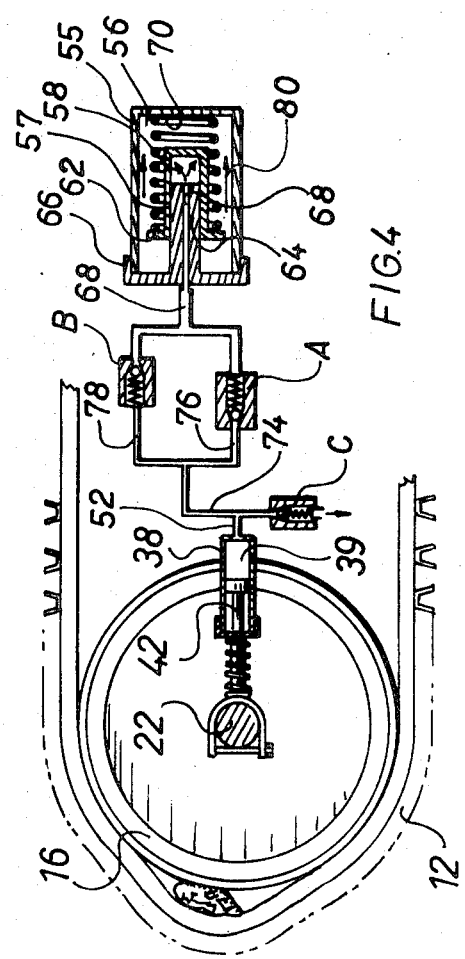

ENDLESS TRACK TENSION RELEASE MECHANISM

The present invention relates to a mechanism for maintaining the tension in the track of a track-laying vehicle and, more particularly, of the crawler type vehicle.

These types of vehicles are normally equipped with a pair of endless tracks disposed on each side of the longitudinal axis of the vehicle. Extending transversely of each track and supported between the lower and upper run by means of side beams secured to and underneath the frame of the vehicle, axles are provided to support idler wheels usually arranged in a tandem. Disposed at the front end of each track loop, a driving sprocket imparts a driving force to the track; the rear end of the track loop surrounds the idler wheels. During operation of these vehicles, objects, such as lugs or rocks, often are wedged between the track and the wheels thereby causing an expansion force which in some cases results in breakage of the track. Prior to the present invention, overload release mechanisms to prevent overtension in the track consisted in a check valve which, when actuated, would discharge the fluid of a source of hydraulic fluid under pressure to thereby remove the tautness in the track. However, these mechanisms are quite ineffective in that, each time an object is caught between the wheel and the track, the operator must re-establish the desired track tension by reloading the source of fluid with a new supply of fluid. These tedious and time-consuming operations are sometimes overlooked by the operators and the vehicles are operated with some slack in the track, thereby greatly increasing its wear. Another method consists in using springs to respond to the overload caused by an obstruction between the idler wheel and the track; however, it has been found that in order to obtain satisfactory results, large size springs are required, a considerable disadvantage due to the limited space available inside the track loop and between the idler wheels when used in pairs in a tandem arrangement.

The principal object of the present invention is the provision of a mechanism which, while preventing overtension in the track, will automatically return the idler wheels to their original position once the object wedged between the wheels in the track, is removed.

A more specific object of the present invention is the provision of a novel track-tensioning mechanism which will enable the grease or oil discharged from one cylinder due to overtension in the track to be accumulated in a second cylinder in which is housed a prestressed spring which causes the return of the grease or oil to the first cylinder after the obstruction between the track and the wheel is removed.

The present invention relates to a tensioning device for use in a track-propelled vehicle having a frame and an endless track looped around at least one driving sprocket and one idler wheel secured to the frame for maintaining the track under proper tension as a result of transient conditions of overtension in the track, which comprises a first cylinder supported by said frame and adapted to receive therein a non-compressible fluid, a movable piston having one end connected to the axle of the idler wheel and the other end hydraulically actuable in said cylinder, an hydraulic accumulator supported by said frame and including a housing defining a first chamber therein, a second expansible chamber movable in said first chamber, a prestressed spring in said first chamber and having one extremity in abutment with said first chamber and the other extremity in abutment with said second chamber; and hydraulic conduit means connecting the first cylinder with the second chamber and allowing a transfer of the fluid in the second chamber when the force exerted on the movable piston by the idler wheel axle exceeds a predetermined value.

A preferred embodiment of the present invention will be described in the following paragraphs and illustrated in the attached drawings in which:

FIG. 1 is a perspective view partly broken away, of a crawler-type vehicle having a pair of endless tracks and utilizing a track tensioning device according to the present invention;

FIG. 2 is a side elevational view of the track tensioning device used on the vehicle shown in FIG. 1;

FIG. 3 is a top plan view, partly broken away, of the device shown in FIG. 2; and FIG. 4 is a schematic view of the track-tensioning device.

Referring to FIG. 1, there is shown a crawler-type vehicle 10 provided on each side thereof with a pair of endless tracks 12. Each track is looped around a driving sprocket 14, a pair of idler wheels 16 in tandem arrangement with wheels 18; a third set of wheels 19 is also provided between the tandem arrangement and the sprocket 14. Idler wheels 16 are mounted on axle 22 while wheels 18 are mounted on axle 23; wheels 19 are mounted on axle 25 supported by frame 24 of the vehicle by means of beams 27 and 27'. It will be understood that the right-hand side of the vehicle shown in FIG. 1 is identical in structure and configuration to the left-hand side and the description here given with reference to the right side applies equally to the left side. Drive sprockets 14 are operatively connected to the vehicle engine 15 and are adapted to propel tracks 12 in a conventional manner.

In the particular vehicle shown in FIG. 1, the frame 24 of the vehicle extends longitudinally over the endless tracks 12 and further supports a pair of V-shaped vertical beams 28 and 30, the lower end of which is connected to a spindle 32 transversely disposed to the track 12.

In order to maintain suitable track tensioning under normal conditions, a track tensioning device 34 (see FIG. 2) is secured to a frame 35 extending between each pair of wheels 16 and 18. The track tensioning device 34 consists of a first cylinder 36 in the working chamber of which is received a relatively non-compressible fluid, such as oil or semi-fluid such as grease, which is pumped into the cylinder chamber 38 through fitting 40. A piston 42, received in the first cylinder 36, has one end fixedly secured to a U-shaped bolt 44 mounted on axle 22; the other end of piston 44 is movable in the cylinder chamber 38 and extends through a cylinder cap 46 sealingly closing one end of the cylinder 36. A spring 48 ensures the fixing of cap 46 on cylinder 38. At the other end of cylinder 36 is secured a check valve 50, the function of which in the present invention will hereinafter be described. The check valve 50 is in communication with the cylinder chamber 38 by means of a passage 52. Prior to the present invention, overtension of the endless track due to an obstruction being lodged between the track and the idler wheels, was avoided by causing the immediate discharge of the fluid outside the cylinder chamber by means of a check valve similar to the one indicated at 50. However, this mechanism caused the track to remain slack until oil or grease was again pumped in the cylinder chamber 38 through fitting 40.

The improvement of the present invention consists in providing a fluid accumulator 54 which collects all the fluid discharged out of cylinder chamber 38 when overtension is present in the track. Referring to FIGS. 2-4, accumulator 54 consists of a an elongated cylindrical housing 55 appropriately supported on frame 35 and defining a chamber 56 in which is received a second cylinder 57 defining therein a second expansible hydraulic working chamber 58. Cylinder 57 is provided at one end with a flange 62. Received inside chamber 58 is a piston 64 which is fixed to the cap 66 of the accumulator 54. The ends of the cylinder 55 form first and second abutments. Piston 64 is provided with an axial passageway 68 communicating with the chamber 58. Inside the first chamber 56, a prestressed spring 70 surrounds cylinder 57; spring 70 has one end bearing against the flange 62 of the cylinder 57 and the other end in abutment with the opposite end surface 72 of the chamber 56.

An hydraulic conduit system enables communication between cylinder 38 and cylinder 57 and consists of fluid lines and check valves as represented schematically in FIG. 4. The inside chamber of cylinder 57 is connected to line 52 which communicates via conduit 74 and parallel branches 76 and 78 with axial passageway 68 of fixed piston 64; check valves A and B, respectively provided in fluid lines 76 and 78, are set to operate only when the pressure has exceeded respective predetermined values.

The operation of the tensioning device will be described in the following paragraph.

Under normal conditions, the track is kept under tension by pressurized fluid inside chamber 39 of cylinder 38 which causes the piston 42 to exert on the idler wheel axle 22 a suitable force which is transmitted to the track to maintain it under proper tension. When an object is wedged between the idler wheel and the track, the reactive force is increased thereby causing piston 42 to move the fluid outside the chamber 38. Instead of being discharged outside through check valve 50, as it was previously done, the fluid circulates through conduit 74; the excess of pressure causes the check valve A to open and to allow the fluid to be received in chamber 58 via passage 68. The entry of pressurized fluid in chamber 58 causes the cylindrical member 57 to axially slide over piston 64 as indicated by arrow 80 in FIG. 3. In so doing, spring 70 is further compressed. Since idler wheel 16 keeps on rotating, the obstruction is dislodged after one half turn. Excess pressure no longer exists in the fluid and check valve A is closed; the compressed spring 70 acting on flange 62 forces the fluid inside the chamber 58 to return in passageway 68 and through the check valve B which opens due to the excess pressure created by the return action of spring 70. Fluid is thus repumped in chamber 39 via conduits 78, 74 and 52, thereby causing axle 22 to return to its original position and track 12 to its normal tension.

As a safety device, check valve 50 may be used in cases where the object lodged between the track and the idler wheel would cause the fluid pressure to exceed the value determined for the use of accumulator 54.

While the invention has been described above in relation to one specific form of the invention, persons skilled in the art will be aware that it may be refined and modified in various ways without departing from its scope. We therefore wish to have it understood that this invention is not to be limited in interpretation except by the terms of the following claims.

We claim:

1. A tensioning device for use in a track-propelled vehicle having a frame and an endless track looped around at least one driving sprocket and one idler wheel secured to said frame for maintaining the track under proper tension as a result of transient conditions of overtension in the track comprising a first cylinder and a piston which constitute a piston and cylinder unit defining a main expansible hydraulic working chamber, at least one of said piston and cylinder members of the unit being a movable member which is movable relative to the other member, the movable member having one end connected to the axis of the idler wheel and the other end hydraulically actuatable in said main working chamber, the other member of the unit being connected to the frame, a hydraulic accumulator supported by said frame and including first and second opposed abutment members fixed to the frame, an accumulator expansible hydraulic working chamber having a second cylinder movable between said abutment members, a prestressed spring having one extremity in abutment with the first abutment member and the other extremity in abutment with the second cylinder and urging the same against the second abutment member; a piston fixed to the frame and extending from the second abutment member towards the first abutment member within the second cylinder, the sides of the piston being sealingly engaged with the walls of the second cylinder such that the said accumulator working chamber is formed between an end of the second cylinder and the end of the fixed piston closest to the first abutment member, an axial passage through the fixed piston placing the main and accumulator working chambers into fluid communication with each other, and hydraulic conduit means connecting the main working chamber with the accumulator working chamber and allowing a transfer of fluid into the accumulator working chamber when the force exerted on the movable member by the idler wheel axle exceeds a predetermined value, said hydraulic conduit means including a pair of parallel fluid lines, one-way valve means in each of said fluid lines, the valve means in a first of said parallel fluid lines being openable toward the accumulator working chamber after a given pressure has been exerted thereagainst to transfer fluid from the main working chamber to the accumulator working chamber to compress said prestressed spring; and the one-way valve means in the other of said parallel fluid lines being openable from the accumulator working chamber to the main working chamber to allow the passage of said fluid in its fluid line when the transient condition of overtension in the track is terminated to return said fluid to the main working chamber.

2. A device according to claim 1, including an elongated housing fixed to the frame, the ends of which housing form said first and second abutment members, the fixed piston and the second cylinder being located within said elongated housing.

3. A device according to claim 1, said movable member being the piston, the said first cylinder being fixed to the frame.

4. A device as defined in claim 1 wherein said first cylinder further includes second valve means in fluid communication with the main working chamber for discharging said fluid outside said device when the force exerted on the movable piston exceeds a second predetermined value greater than said first predetermined value.

* * * * *